Oct. 13, 1936.  C. B. McCARTHY  2,057,200
TIRE CHANGING APPARATUS
Filed April 18, 1935
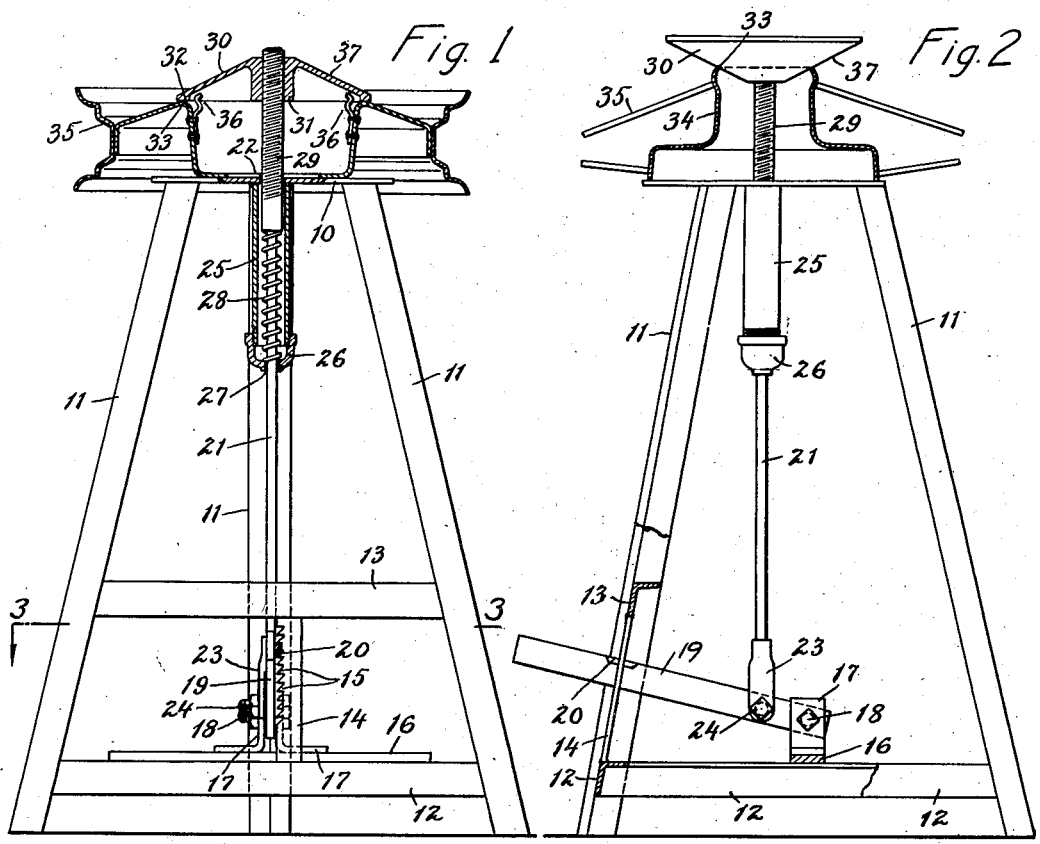
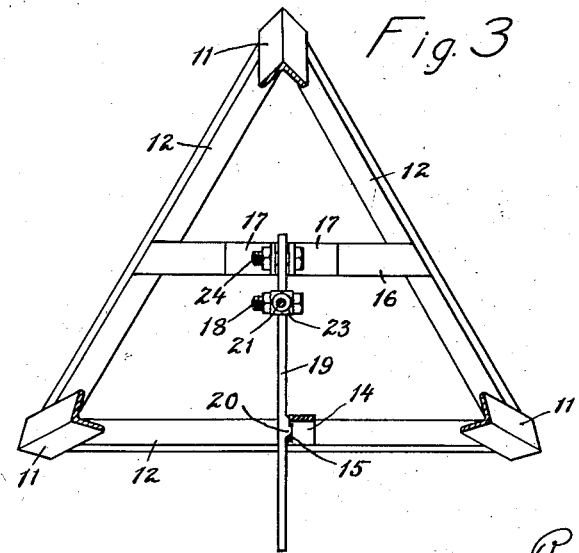
Inventor,
C. B. McCarthy,
By Robert M. Pierson,
Attorney Patented Oct. 13, 1936

2,057,200

UNITED STATES PATENT OFFICE 2,057,200

TIRE CHANGING APPARATUS

Clement B. McCarthy, Mansfield, Ohio

Application April 18, 1935, Serial No. 17,072

11 Claims. (Cl. 144—288)

This invention, relating to stands for holding a pneumatic-tired wheel while its tire is being changed, has for its general object to provide a comparatively inexpensive apparatus of this class permitting the changing of tires to be effected with greater speed and facility. Further objects are to provide improved wheel-clamping means which will not mar the finish of the wheel, and also to provide a tire-clamping member adapted to operate on the outer ends of wheel hubs having projections for retaining the detachable hub cap, and one which is reversible so as to operate on such wheels as well as those having narrower hub openings.

Of the accompanying drawing, Fig. 1 is a front elevation, partly in section, showing a preferred form of my invention, together with the work held therein.

Fig. 2 is a side elevation, partly in section, showing the stand in use with a different form of wheel.

Fig. 3 is a horizontal section on the line 3—3 of Fig. 1.

In the drawing, 10 is a horizontal circular disk or platform constituting a fixed lower wheel-clamping member and provided with a leg structure of tripod form including three outwardly-slanted angle-iron legs 11, welded at their upper ends to the lower side of the platform, and three horizontal brace bars 12 of angle iron welded at their ends to the legs 11 a short distance above the lower ends of the latter. Above the front brace a horizontal angle-iron bar 13 has its ends welded to the two front legs.

A vertical rack bar 14 has its ends welded respectively to the bar 13 and the front brace bar 12 and is formed on one edge with a series of ratchet teeth 15. A horizontal bar 16 is welded at its ends to intermediate points of the two rear braces 12 so as to form an A therewith. On the upper side of this bar are welded the horizontal arms of a pair of bracket members 17 between which, on a pin 18 carried by the vertical arms of said bracket members, is fulcrumed the rear end of a treadle lever 19 formed with a tooth or detent 20 for engaging the ratchet teeth, said lever being engaged with or released from the ratchet by a slight lateral swinging movement.

A vertical clamp-operating rod 21 projects through the platform 10 and has a sliding fit in a central aperture 22 of the latter, the lower end of said rod having a clevis 23 and pin 24 pivotally connecting it with an intermediate point on the lever 19, near the latter's fulcrum. A rod-guiding and spring-encasing tube 25 has its upper end welded to the lower side of the platform 10, centrally of the latter, and is provided at its lower end with a screw cap 26 apertured at 27 for a sliding fit with the rod 21.

Within the tube or casing 25 and surrounding the rod 21 is a spring 28 for elevating said rod, said spring bearing at its lower end against the cap 26 and at its upper end against the shoulder formed by the lower end of a screw 29 which constitutes the upper portion of the rod projecting through the platform. Said screw carries an upper or movable wheel-clamping member 30 whose hub 31 is formed as a nut having threads engaging those of the screw, whereby said member 30 is made vertically adjustable on the rod to accommodate different lengths of wheel hubs and permit the member to be set against the hub without changing the operative position of the lever 19. The screw threads are preferably double and of such steep pitch, such as four turns—that is, two per thread to the inch, on a screw of $\frac{7}{8}$ inch outer diameter, that the member 30 will turn and descend by its own weight, permitting it to be quickly spun down into clamping position or quickly elevated for removal from the screw by a reversal of the turning movement.

The clamping member 30 is cup-shaped and has a preferably continuous outer edge or rim portion 32 of narrow width for bearing on the outer margin or cap seat 33 of the hub 34 of a wheel 35 having a wide-mouthed hub. Said bearing rim then falls outside of the spring catches 36 or similar members provided on such wide-mouthed hubs for retaining the hub cap, and the projecting ends of these catches or other retaining members are received within the hollow interior of the member 30 without being crushed thereby when said member is moved into clamping position, all as illustrated in Fig. 1. The member 30 may have any suitable wall contour for effecting this purpose.

The opposite or convex side 37 of the cup-shaped clamping member 30 is formed of conoidal shape, for example frusto-conical as shown, and adapted, as illustrated in Fig. 2, partially to enter the outer mouth and engage with the edges of the hub 34 of a wheel having a narrower mouthed hub and no cap-retaining projections, by inversion or reversal of said member, and also to fit such narrower hubs of different mouth diameters.

In operating my invention, for example on a large-hub wheel as illustrated in Fig. 1, the clamping member 30 is removed and the wheel 35 placed on the platform 10 with the inner edge of its hub resting on the latter. The foot lever 19 being disengaged from the ratchet bar 14, said clamping member is then fitted on the screw 29, with its rim 32 down, and quickly spun down into place to set its rim in clamping position on the wheel hub 34. This action affords a quick or rough adjustment for the clamping member and its initial contact with the wheel hub can be lightly made, without liability to mar the wheel finish, because the annular bearing face 32 of said member is continuous.

The final, high-pressure clamping movement of relatively small amplitude is imparted to the member 30 by the operator stepping on the outer end of the treadle lever 19, thereby drawing the rod 21 downwardly against the pressure of the spring 28. The lever is retained in its depressed position by laterally swinging it against the fixed bar 14 to bring its tooth 20 under one of the ratchet teeth 15, and the wheel hub is thereby held firmly clamped between the members 10 and 30. There is sufficient spring in the rod 21 and enough play or lost motion of said rod and of the lever 19 on their respective guides or supports to permit the angular vertical movement of the lever and its lateral movement for engaging the ratchet, and there is enough spring in the lever-supporting bar 16 to bring the lever tooth down for one or more ratchet teeth in effecting a firm clamping action. Inasmuch as the amplitude of required vertical clamping movement of the rod 21 is very much reduced by the vertical adjustability of the member 30 on the rod, particularly when this is a screw connection between the two as shown, permitting the clamping member to be set down against the wheel hub before the clamping movement begins, it is possible to use a short-stroke lever of great power having, for example, the illustrated length ratio of at least 6 to 1 between its long arm extending from its outer end to the center of the fulcrum pin 18 and its short arm extending between the centers of the pins 18 and 24.

With the wheel thus securely held, tire mounting and demounting operations are easily performed, and if necessary to hold down the stand and tire against upward pressure in loosening a tight lower tire bead, this may be done by the operator stepping on one of the horizontal braces 12. When the tire has been changed, the clamping pressure is relieved by kicking the lever 19 out of engagement with the ratchet bar, and the wheel may then be quickly released and removed from the stand on screwing off the member 20. Wheel hubs of smaller mouth diameter are clamped and released as described, with the member 30 inverted as shown in Fig. 2.

It is preferred to make the stand portable rather than securing it to the floor, as this enables it to be moved about for the most convenient tire-changing locality and also permits the stand, with the wheel clamped thereon, to be turned down on its side to bring the wheel into a substantially vertical plane when it is desired to manipulate the tire in that position.

It will be understood that the form of embodiment may be varied without departing from the scope of my invention as defined in the claims.

I claim:

1. A tire-changing stand comprising a fixed platform for supporting a pneumatic-tire wheel by the inner edge of its hub, a slidable rod projecting through said platform and formed with a screw on one side of the platform, a hub-engaging clamping member threaded on said screw for engaging the outer edge of the wheel hub, a lever connected with said rod on the opposite side of the platform, and means for holding said lever in different positions.

2. A tire-changing stand comprising a horizontal wheel-supporting platform having a supporting leg structure, a vertically-slidable rod projecting through said platform, a wheel-hub clamping member detachably mounted on the upper end of said rod and adjustable longitudinally thereof, a treadle lever pivotally mounted on said leg structure and connected with said rod for depressing the latter, and ratchet means for adjustably holding down said lever.

3. A tire-changing stand comprising a wheel-supporting platform, a slidable rod projecting through said platform, rod-operating means, and a reversible cup-shaped wheel-clamping member carried by said rod, said member having a rim portion adapted to engage the wheel hub in one position of the member and being substantially coniform on its convex side for engaging and centering wheel hubs of relatively small diameter in the reverse position.

4. Tire-changing apparatus comprising a cup-shaped hub clamping member having a hub and a continuous annular rim for engaging the cap seat of a relatively wide-mouthed wheel hub, and formed adjacent said rim to receive projecting cap-fasteners on the wheel hub, and means detachably connected with the hub of said member for moving the latter.

5. Tire-changing apparatus comprising a reversible cup-shaped clamping member having a hub formed as a nut, an annular flat engaging face at its wider end, and a solid, substantially conical connecting web, and a longitudinally slidable threaded rod screwing in said hub.

6. A tire-changing stand comprising a fixed lower clamping platform, a slidable rod extending through said platform, and an upper hub clamping member detachably engaging said rod by mating screw threads on the respective members of such steep pitch that the upper clamping member will rotate and descend on the rod by its own weight.

7. A tire-changing stand comprising fixed and movable wheel-hub clamping members, a supporting leg structure for the fixed member, a rod on which the movable member is detachably and adjustably mounted for operating said movable member, a treadle lever for operating said rod, a ratchet for holding down said lever, and lever-mounting means on said leg structure including a yieldable lever fulcrum.

8. A tire-changing stand according to claim 7 in which the leg structure includes fixed tripod legs, a set of lower brace bars connecting said legs, and a spring bar connecting a pair of said brace bars and constituting the lever fulcrum support.

9. A tire-changing stand comprising a fixed horizontal platform, a movable clamping member above and coacting therewith to hold a wheel hub, a rod projecting through said platform for operating said clamping member, a supporting leg structure for said platform including front and rear legs, front and side lower braces connecting the legs, a transverse fulcrum bar connecting the side braces, an upper bar connecting the front legs, a vertical fixed ratchet connecting said front brace and bar, and a lever fulcrumed on said fulcrum bar and adapted to be held down in wheel-clamping position by said ratchet.

10. A tire-changing stand comprising a fixed horizontal wheel-hub supporting platform having a supporting leg structure, a slidable rod extending through said platform, a rod-guiding and spring-encasing tube attached to the lower side of said platform, a rod-elevating spring in said tube, a movable wheel-hub clamping member mounted on said rod, and lever means on said leg structure for operating the rod.

11. A wheel holder comprising a platform constituting a lower hub-supporting and clamping member and having a supporting leg structure and a lever-fulcrum support connected therewith, a vertically-slidable rod projecting through said platform, spring means yieldingly elevating said rod, an upper detachable hub-clamping member carried by said rod and adjustable for setting movement vertically thereof to reduce the required amplitude of clamping movement of the rod, a treadle lever fulcrumed on said fulcrum support and having a length ratio of its long and short arms not substantially less than 6 to 1, and ratchet means for holding down said lever.

CLEMENT B. McCARTHY.